United States Patent
Adjabeng (10) Patent No.: US 11,400,388 B2
(45) Date of Patent: Aug. 2, 2022

(54) LARGE SCALE STANDALONE CHILLERS, ALL-IN-ONE ROTARY EVAPORATORS AND RELATED METHODS

(71) Applicant: Ecodyst, Inc., Apex, NC (US)

(72) Inventor: George Adjabeng, Apex, NC (US)

(73) Assignee: Ecodyst, Inc., Apex, NC (US)

( * ) Notice: Subject to any disclaimer, the term of this patent is extended or adjusted under 35 U.S.C. 154(b) by 0 days.

(21) Appl. No.: 16/489,603

(22) PCT Filed: Apr. 3, 2018

(86) PCT No.: PCT/US2018/025812
§ 371 (c)(1),
(2) Date: Aug. 28, 2019

(87) PCT Pub. No.: WO2018/187276
PCT Pub. Date: Oct. 11, 2018

(65) Prior Publication Data
US 2020/0016506 A1  Jan. 16, 2020

Related U.S. Application Data

(60) Provisional application No. 62/480,657, filed on Apr. 3, 2017.

(51) Int. Cl.
*B01D 1/22* (2006.01)
*B01D 3/02* (2006.01)
(Continued)

(52) U.S. Cl.
CPC .............. *B01D 1/222* (2013.01); *B01D 3/02* (2013.01); *B01D 3/06* (2013.01); *B01D 3/08* (2013.01);
(Continued)

(58) Field of Classification Search
CPC . B01D 1/222; B01D 3/02; B01D 3/06; B01D 3/08; B01D 3/10; B01D 5/0045; B01D 5/006
See application file for complete search history.

(56) References Cited

U.S. PATENT DOCUMENTS

D83,687 S    3/1931  MacReady
2,128,784 A  8/1938  Tull
(Continued)

FOREIGN PATENT DOCUMENTS

JP  S57-065304  4/1982
JP  H08-119608  5/1996
(Continued)

OTHER PUBLICATIONS

International Search Report and Written Opinion for Application No. PCT/US2018/025812 dated Jun. 11, 2018.
(Continued)

*Primary Examiner* — Jonathan Miller
(74) *Attorney, Agent, or Firm* — Jenkins, Wilson, Taylor & Hunt, P.A.

(57) ABSTRACT

Integrated rotary evaporator apparatuses are provided. Such rotary evaporators include a vertically oriented evaporator for evaporating a sample to form a sample evaporate, a mixing apparatus for mixing the sample in the evaporator, a condenser for condensing the evaporated sample into a condensate, a collection vessel for collecting the condensate, a vacuum pump to create a vacuum in the evaporator, and a refrigeration system integrated into the condenser, where all components are integrated into a single apparatus. Standalone large-scale chillers for cooling a liquid, vapor or other medium are also provided. Such chillers include a heat exchanger or evaporator, a condenser, a compressor, and a temperature controller, all integrated into a single standalone chiller usable with any vessel or reservoir containing liquids,
(Continued)

vapors or other medium from which heat is to be removed. Methods of using such devices to distill, evaporate and/or cool a sample or medium are provided.

11 Claims, 6 Drawing Sheets

(51) Int. Cl.
  *B01D 3/06* (2006.01)
  *B01D 3/08* (2006.01)
  *B01D 3/10* (2006.01)
  *B01D 5/00* (2006.01)

(52) U.S. Cl.
  CPC .............. *B01D 3/10* (2013.01); *B01D 5/006* (2013.01); *B01D 5/0045* (2013.01)

(56) References Cited

U.S. PATENT DOCUMENTS

| | | | |
|---|---|---|---|
| 2,566,865 A | 9/1951 | Wingerter | |
| 3,219,551 A * | 11/1965 | Carel | G01N 25/14 202/161 |
| 3,607,662 A * | 9/1971 | Glover | B01D 5/0045 202/160 |
| 4,369,097 A * | 1/1983 | Nezu | B01D 3/00 202/184 |
| 5,110,508 A | 5/1992 | Buettgen et al. | |
| D328,995 S | 9/1992 | Verheijen | |
| 5,164,049 A * | 11/1992 | Clark | B01D 1/02 134/12 |
| 5,176,799 A | 1/1993 | Roe et al. | |
| D344,527 S | 2/1994 | Drago et al. | |
| 5,340,444 A * | 8/1994 | van der Heijden | B01D 3/10 202/183 |
| 5,354,428 A * | 10/1994 | Clark | B01D 1/02 159/DIG. 19 |
| D358,290 S | 5/1995 | Schroeder | |
| 5,916,351 A | 6/1999 | Sintchak | |
| 6,419,796 B1 * | 7/2002 | Kitamura | B01D 3/14 202/153 |
| D600,492 S | 9/2009 | Hammad et al. | |
| D669,154 S | 10/2012 | Choi | |
| 8,563,844 B2 | 10/2013 | Gray et al. | |
| 8,564,129 B2 | 10/2013 | Therrien et al. | |
| 8,893,513 B2 | 11/2014 | June et al. | |
| 8,901,612 B2 | 12/2014 | Gray et al. | |
| 8,991,194 B2 | 3/2015 | Edwards et al. | |
| 9,005,403 B2 | 4/2015 | Adjabeng | |
| D735,527 S | 8/2015 | Palermo et al. | |
| D750,209 S | 2/2016 | Satou | |
| D760,305 S | 6/2016 | Salin | |
| D803,276 S | 11/2017 | Adjabeng et al. | |
| 10,221,079 B2 * | 3/2019 | Ahmed | C02F 1/043 |
| 10,307,688 B2 * | 6/2019 | Adjabeng | B01D 3/085 |
| D860,268 S | 9/2019 | Jakobsen | |
| D903,727 S | 12/2020 | Adjabeng et al. | |
| 2006/0231378 A1 | 10/2006 | Wolfgang et al. | |
| 2011/0073459 A1 * | 3/2011 | Adjabeng | B01D 3/085 202/185.6 |
| 2012/0085635 A1 | 4/2012 | Haynes | |
| 2014/0144767 A1 * | 5/2014 | Jost | B01D 3/02 203/2 |
| 2016/0146519 A1 | 5/2016 | Ito | |

FOREIGN PATENT DOCUMENTS

| | | |
|---|---|---|
| JP | 2009-172468 | 8/2009 |
| JP | 2009-540095 | 11/2009 |
| WO | WO 2011/151484 A1 | 12/2011 |
| WO | WO 2016/086101 | 6/2016 |
| WO | WO 2016/201223 A1 | 12/2016 |

OTHER PUBLICATIONS

Notice of Publication corresponding to European Patent Application No. 18781689.7 dated Jan. 15, 2020.
Office Action corresponding to U.S. Appl. No. 29/637,487 dated Mar. 12, 2020.
Notice of Allowance corresponding to U.S. Appl. No. 29/637,487 dated Jul. 31, 2020.
European Search Report corresponding to European Patent Application No. 18781689.7 dated Jul. 15, 2020.
Office Action corresponding to Indian Patent Application No. 201947044500 dated Dec. 21, 2020.
Office Action corresponding to European Patent Application No. 18781689.7-1101 dated Mar. 25, 2021.
Office Action corresponding to Chinese Patent Application No. 201880036457.4 dated Apr. 14, 2021.
Hearing Notice corresponding to Indian Patent Application No. 201947044500 dated Jul. 1, 2021.
Office Action corresponding to European Patent Application No. 18781689.7-1101 dated Nov. 23, 2021.
Office Action corresponding to Japanese Patent Application No. JP 2020-502543 dated Aug. 3, 2021.
Patent Certificate Corresponding to Indian Patent Application No. 201947044500 dated Oct. 20, 2021.
Office Action corresponding to Chinese Patent Application No. 201880036457.4 dated Oct. 19, 2021.
Rejection Decision corresponding to Chinese Patent Application No. 201880036457.4 dated Mar. 23, 2022.
Communication Pursuant to Article 94(3) EPC corresponding to European Patent Application No. 18781689.7 dated May 18, 2022.

\* cited by examiner

LARGE SCALE STANDALONE CHILLERS, ALL-IN-ONE ROTARY EVAPORATORS AND RELATED METHODS

CROSS REFERENCE TO RELATED APPLICATIONS

This application claims the benefit of and priority to U.S. Provisional Patent Application Ser. No. 62/480,657, filed Apr. 3, 2017, the disclosure of which is incorporated herein by reference in its entirety.

TECHNICAL FIELD

The presently disclosed subject matter relates to large scale standalone chillers, all-in-one rotary evaporators and related methods. The presently disclosed subject matter also relates to high-capacity and/or high-speed distillation systems and devices.

BACKGROUND

Chilling or cooling devices are used in laboratories and industries throughout the world, such as for cooling semiconductor equipment, medical equipment, medical and industrial lasers, electron microscopes, analytical instrumentation, and printing equipment. Other applications include plastics processing and testing, cryogenic testing, biological applications, pharmaceutical synthesis, and chemical synthesis. Additionally, chillers are used to provide cooling for rotary evaporators, a device used in chemical laboratories to remove solvents from samples by evaporation and in molecular cooking for the preparation of distillates and extracts.

Chillers are refrigerated cooling systems that generally include a compressor, condenser, evaporator, pump, reservoir, and temperature controller. Chillers cool down samples or processes by removing heat from one element and transferring it to another. Chillers are often referred to as recirculating chillers or coolers, which describe cooling liquid or medium (coolant) that is pumped through the system to be cooled and returned to the chiller.

Chillers are used for example in laboratories and industries throughout the world, such as for cooling semiconductor equipment, medical equipment, medical and industrial lasers, electron microscopes, analytical instrumentation, and printing equipment. Other applications include plastics processing and testing, cryogenic testing, biological applications, pharmaceutical synthesis, and chemical synthesis. Additionally, chillers are used to provide cooling for rotary evaporators, a device used in chemical laboratories to remove solvents from samples by evaporation and in molecular cooking for the preparation of distillates and extracts.

Chillers have proven valuable for use in laboratories and industries. They are generally considered environmentally friendly and water saving laboratory devices to cool, for example, a rotary evaporator. As a result of various cooling needs of laboratories and industries, several versions of chillers with different temperature ranges exist today.

What are needed are chiller designs and systems that provide sufficient cooling capabilities that are cost effective and easy to use. It would be advantageous to reduce size, weight and complexity, improve cooling temperature ranges and cooling functions of chillers. Additionally, chiller designs that are multifunctional, flexible and easier to use are needed, particularly where improved functionalities can be realized.

In some cases high capacity chillers are needed to cool large volumes of coolant and/or liquid in industrial applications and laboratory settings. Coupling the above advantages with high capacity cooling in a large stand-alone chiller is needed.

Rotary evaporators are also in widespread use in laboratories throughout the world, for removing solvents from organic and inorganic solutions, to yield a liquid or solid product.

Generally speaking, such evaporators or distillers work by placing a sample in a round-bottom flask, typically a pear-shaped flask, which spins on an axis at an angle while sitting in a heated water bath. The flask is attached to a motorized rotary joint that enables the flask to spin, while permitting the evaporated solvent to flow through the joint (vapor duct) and come into contact with one or more condensers. The condenser(s) cool the vapor, and the resulting cooled vapor (i.e., liquid) then flows down to a flask below the condenser, where it can be collected.

A water bath can typically be provided to supply sufficient heat to the flask to evaporate the solvent. Typically, the rotor, the motor, the rotary joint, the condenser, the flask used to hold the original solvent, and the flask used to hold the condensed vapor as it is collected, are all connected while the unit is in operation. A mechanical arm is usually provided to raise and lower the connected parts, to bring the flask out of the water bath.

The condenser of the rotary evaporator can be connected to a water source, and water is frequently acceptable to condense the solvent of interest, particularly if the solvent has a relatively high boiling point. Users frequently leave the water flowing through the condenser throughout the day, which results in large volumes of waste water. Further, where the solvent has a particularly low boiling point, it can be advantageous to cool the vapor to temperatures cooler than a water condenser can provide. To only use a water-cooled condenser might create an environmental issue, as a significant volume of volatile organic solvent would not be collected, and could instead enter into the environment.

Particularly, when low boiling solvents are used, efforts have been made to improve on the condensation of the vapors so as to trap a significant portion of the solvents. In such cases, one approach is to use a dry-ice condenser, which is packed with dry ice, and, optionally, a solvent that forms a slurry with dry ice to maintain a given temperature (for example, dry ice-acetone maintains a temperature of −78° C.). This can be a burden since the dry ice has to be replenished frequently.

What is needed are rotary evaporator designs and systems, and/or distillation systems, that provide sufficient cooling and condensing capabilities that are cost effective and easy to use. Additionally, rotary evaporator designs that are fully integrated and easier to use are needed, particularly where improved yield and efficiencies can be realized. Moreover, rotary evaporator designs that are coupled with a high capacity chiller can provide for needed high capacity distillation requirements in some industrial and laboratory settings. Finally, completely integrated continuous alcohol extraction and evaporation systems are needed.

Such advantages, and others disclosed herein, are provided by the instant disclosure.

SUMMARY

The presently disclosed subject matter provides compact chiller and cooler apparatuses, devices and systems configured to operate efficiently while taking up less space.

Provided herein in some embodiments are integrated rotary evaporator apparatuses, comprising a vertically oriented evaporator configured to evaporate a sample to form a sample evaporate, a mixing apparatus configured to mix the sample in the evaporator, a condenser configured to condense the evaporated sample into a condensate, a collection vessel configured to collect the condensate, a vacuum pump configured to create a vacuum in the evaporator, and a refrigeration system integrated into the condenser, wherein the vertically oriented evaporator, mixing apparatus, condenser, collection vessel, vacuum pump and refrigeration system are integrated into a single apparatus.

In some embodiments, the mixing apparatus comprises an overhead stirrer configured to stir the sample at about 500 to about 6,000 revolutions per minute (rpm). In some embodiments, the vertically oriented evaporator comprises a large volume vessel having a volume of about 6 L to about 100 L. In some embodiments, the vertically oriented evaporator comprises a product drain valve, wherein the vertically oriented evaporator comprises a sample valve.

In some embodiments, such systems can further comprise a heating mantle configured to heat the sample in the vertically oriented evaporator. In some embodiments, such systems can further comprise a cooling coil configured to engage the condenser so as to provide the condenser with the ability to cool and condense the sample evaporate coming into contact with the condenser.

In some embodiments, the refrigeration system comprises a condenser and refrigerant, wherein the refrigeration system provides coolant to the condenser to thereby condense the sample evaporate from the evaporator. In some embodiments, the coolant is provided to a double coil inside the condenser, wherein the double coil inside the condenser is configured to contact the sample evaporate.

In some embodiments, such a system can further comprise a structural frame configured to integrate all components into a single apparatus. In some embodiments, the condenser comprises two or more condensers in a series.

In some embodiments, such a system further comprises an adaptive cooling regulator configured to increase or decrease the cooling capacity of the condenser and/or refrigeration system. In some embodiments, the adaptive cooling regulator comprises a digitized expansion valve. In some embodiments, the adaptive cooling regulator increases the cooling capacity of the condenser and/or refrigeration system upon detecting an increased heat load from the evaporator, and the adaptive cooling regulator decreases the cooling capacity of the condenser and/or refrigeration system upon detecting a decreased heat load from the evaporator.

In some embodiments, provided herein are standalone large-scale chiller configured to cool a liquid, vapor or other medium in a vessel or reservoir, comprising: a heat exchanger or evaporator configured to be placed or submerged in a vessel or reservoir containing liquids, vapors or other medium from which heat is to be removed, a condenser, a compressor, and a temperature controller, wherein each of the components are integrated into a single standalone chiller, and wherein the chiller is configured to be universally used with any vessel or reservoir containing liquids, vapors or other medium from which heat is to be removed, and wherein the chiller has a cooling capacity of about 4000 watts at −10° C.

In some embodiments, such chillers can further comprise a housing enclosing the condenser, compressor and temperature controller, wherein the heat exchanger is positioned outside of the housing such that it can be submerged or placed in a vessel or reservoir. In some embodiments, such chillers can further comprise a pump for circulating the liquids, vapors or other medium in the vessel or reservoir. In some embodiments, such chillers can further comprise a vacuum pump and controller.

In some embodiments, the heat exchanger, condenser and compressor further comprise a refrigerant, and wherein the heat exchanger, condenser and compressor are in fluid communication with one another. In some embodiments, such chillers can further comprise a heat exchanger configured to be used as a condenser in a rotary evaporator. In some embodiments, such chillers can further comprise a pump outside the chiller housing, wherein the pump is equipped with a detachable reservoir, wherein the pump is configured as a support structure for the reservoir, and wherein the heat exchanger is configured to be placed in the reservoir. In some embodiments, such chillers can further comprise a double wall vessel surrounding the heat exchanger.

In some embodiments, the heat exchanger comprises an evaporator coil, wherein the evaporator coil comprises a material selected from a titanium alloy, stainless steel, copper and combinations thereof. In some embodiments, the chiller can comprise a plurality of heat exchangers and/or evaporators in a series. In some embodiments, the temperature controller comprises an adaptive cooling regulator configured to increase or decrease the cooling capacity of the condenser. In some embodiments, the adaptive cooling regulator comprises a digitized expansion valve. In some embodiments, the adaptive cooling regulator increases the cooling capacity of the condenser upon detecting an increased heat load, and the adaptive cooling regulator decreases the cooling capacity of the condenser upon detecting a decreased heat load.

Also provided herein are methods of distilling a sample into a distillate or extract, comprising providing a sample to be distilled, providing an integrated rotary evaporator apparatus as disclosed herein, and distilling the sample to provide a distillate or extract. In such methods the sample to be distilled can be provided in quantities ranging from about 6 L to about 100 L at a time. In such methods the sample can be provided to the integrated rotary evaporator continuously, wherein the integrated rotary evaporator is configured to contain about 6 L to about 100 L at a time.

An object of the presently disclosed subject matter having been stated hereinabove, and which is achieved in whole or in part by the presently disclosed subject matter, other objects will become evident as the description proceeds when taken in connection with the accompanying Examples as best described hereinbelow.

BRIEF DESCRIPTION OF THE DRAWINGS

The presently disclosed subject matter can be better understood by referring to the following figures. The components in the figures are not necessarily to scale, emphasis instead being placed upon illustrating the principles of the presently disclosed subject matter (often schematically). In the figures, like reference numerals designate corresponding parts throughout the different views. A further understanding of the presently disclosed subject matter can be obtained by reference to an embodiment set forth in the illustrations of the accompanying drawings. Although the illustrated embodiment is merely exemplary of systems for carrying out the presently disclosed subject matter, both the organization and method of operation of the presently disclosed subject matter, in general, together with further objectives and advantages thereof, may be more easily understood by reference to the drawings and the following description. The drawings are not intended to limit the scope of this presently disclosed subject matter, which is set forth with particularity in the claims as appended or as subsequently amended, but merely to clarify and exemplify the presently disclosed subject matter.

For a more complete understanding of the presently disclosed subject matter, reference is now made to the following drawings in which.

DETAILED DESCRIPTION

The presently disclosed subject matter now will be described more fully hereinafter, in which some, but not all embodiments of the presently disclosed subject matter are described. Indeed, the disclosed subject matter can be embodied in many different forms and should not be construed as limited to the embodiments set forth herein; rather, these embodiments are provided so that this disclosure will satisfy applicable legal requirements.

Provided herein are devices and systems for cooling, exchanging heat, or "chilling" materials, liquids, gases, and other compositions, particularly in laboratory and/or research settings. Chillers are refrigerated cooling systems that generally include a compressor, condenser, evaporator, pump, reservoir, and temperature controller. Chillers cool down samples or processes by removing heat from one element and transferring it to another. Chillers are often referred to as recirculating chillers or coolers, which describe cooling liquid or medium (coolant) that is pumped through the system to be cooled and returned to the chiller.

Provided herein are rotary evaporator designs and systems, also referred to as rotavaps, and/or distillation systems, that provide sufficient cooling and condensing capabilities that are cost effective and easy to use. Rotary evaporator designs that are fully integrated and easier to use are also provided. Moreover, rotary evaporator designs configured to provide high capacity evaporation and condensation capabilities, or distillation capabilities, particularly as compared to existing technology, are provided herein. By way of example and not limitation, rotary evaporator systems as provided herein, including evaporator, chiller and collection components, can provide about 6,000 ml, or 6 L, up to about 50,000 ml, or 5 L, of evaporative and condensing capacity. Such systems can provide a significant need for high capacity distillation in industrial and laboratory settings that is unmet with existing rotavap systems.

In some embodiments, provided herein are chillers, also referred to as recirculating chillers, circulating coolers, circulators, and the like. In some embodiments, provided herein are chillers that comprise a compressor, condenser, heat exchanger (or evaporator), and/or temperature controller. In some embodiments such chillers are configured to both fully integrated and configured to handle varying chilling capacities as needed, including high capacity chilling needs (e.g., about 6,000 ml, or 6 L, up to about 50,000 ml, or 5 L). That is, in some aspects a chiller as provided herein can comprise a fully integrated "tankless" chiller apparatus with all components required for operation in an all-in-one design, except the tank or reservoir for recirculated fluid/medium (coolant). The reservoir is not included in the chiller housing in some aspects but is instead a separate component such that the chiller itself is a separate and universal standalone piece of equipment that is not limited by the size/capacity/configuration of the reservoir, and can be configured to be used with a plurality of reservoir sizes, configurations and capacities in a multitude of applications.

In some embodiments, chiller designs having the heat exchanger outside the main housing provides advantages over traditional recirculating chillers. For example, where the heat exchanger is inside the housing the chiller has limited uses and a fixed reservoir capacity. Cooled liquid must be circulated and the heat exchanger cannot be used for other activities like cooling reactions. Nor can such a configuration be used as a circulator bath. When the heat exchanger is inside the housing this means that separate instruments are needed for circulating chillers, circulating baths, immersion coolers, etc. This approach can be expensive, and requires significant laboratory space, which is expensive and in limited supply.

Conversely, chillers designed with the heat exchanger on the outside of the housing, as disclosed herein, can be used directly as a condenser in rotary evaporators. Notably, no coolant is required. Vapors are condensed on the heat exchanger (refrigerant inside the heat exchanger pipes/coils cool the pipes/coils which in turn removes heat from the medium, e.g. vapors, liquid, etc.). Such a configuration results in unlimited and flexible use. Any size reservoir, reaction vessels (to cool down or warm experiments), or circulator baths (to cool down or warm samples placed in the bath) can be used as well. Moreover, it is more cost effective for researchers or users to purchase various size reservoirs, circulating baths, etc., to use with one chiller than purchasing multiple chillers, separate circulator baths and an immersion cooler (used to cool down reactions). By housing the evaporator outside the housing the disclosed chillers can be used in place of at least 4 pieces of equipment (circulating chillers, circulating baths, rotary evaporator condensers, and immersion coolers).

In some embodiments, the disclosed chillers can improve cooling performance over existing cooling devices. For example, the cooling capability can be improved such as in applications that no longer require a coolant, e.g. in rotary evaporators. In traditional chillers the coolant is pumped through hoses from the chiller to the rotary evaporator condenser. Coolant gets warm by the time it reaches the condenser as it absorbs heat from the ambient surroundings. Such is not the case in the disclosed chiller designs.

In some embodiments, a cooling temperature range for the disclosed chillers can range from about +40° C. to about −45° C., about +40° C. to about −100° C., or about +40° C. to about −150° C. Desired temperatures can be achieved through refrigeration engineering and/or refrigerant selection. Such cooling temperatures can be rapidly achieved even for large volumes of material by using the disclosed chillers.

Chiller apparatuses provided herein can in some embodiments comprise integrated cooling systems, such as for example a cooling system and a pump. Such chiller apparatus can further comprise an evaporator positioned outside the housing of the compressor so that the evaporator can be submerged or soaked in a reservoir or bath to remove heat from a liquid or medium within the reservoir or bath, or otherwise exposed to a coolant fluid, liquid, vapor or other cooling medium.

In some aspects, each of the components above, including a compressor for the refrigeration system and a pump, can be integrated into one stand-alone or all-in-one system with one or more heat exchangers/evaporators.

To elaborate, provided herein are chillers, also referred to as recirculating chillers, circulating coolers, circulators, and the like. In some embodiments, provided herein are chillers that comprise a compressor, condenser, heat exchanger (or evaporator), and/or temperature controller. In some embodiments such chillers are configured in a large-scale, or high-capacity, design. That is, in some aspects a chiller as provided herein can comprise a fully integrated "tankless" chiller apparatus with all components required for operation, except the tank or reservoir for recirculated fluid/medium (coolant). The reservoir is not included in the chiller housing in some aspects but is instead a separate component such that the chiller itself is a separate and universal standalone piece of equipment that is not limited by the size/capacity/configuration of the reservoir, and can be configured to be used with a plurality of reservoir sizes, configurations and capacities in a multitude of applications.

In some embodiments chiller designs having the heat exchanger outside the main housing provides advantages over traditional recirculating chillers. For example, where the heat exchanger is inside the housing the chiller has limited uses and a fixed reservoir capacity. Cooled liquid must be circulated and the heat exchanger cannot be used for other activities like cooling reactions. Nor can such a configuration be used as a circulator bath. When the heat exchanger is inside the housing this means that separate instruments are needed for circulating chillers, circulating baths, immersion coolers, etc. This approach can be expensive, and can take up too much precious lab space and waste limited resources.

Conversely, chillers configured with the heat exchanger on the outside of the housing, as disclosed herein, can be used directly as a condenser in rotary evaporators, and/or to cool centrifugal concentrators, vacuum ovens, freeze dryers, gel dryers, DNA sample concentration applications, acid sample concentrations, and the like. In the case of rotary evaporators, for example, no coolant or circulating water is required. Vapors can be condensed directly on the heat exchanger. In some embodiments refrigerant inside the heat exchanger pipes or cooling lines can be configured to cool the pipes or cooling lines which in turn removes heat from the environment surrounding the heat exchanger, e.g. the evaporate.

Moreover, a tankless chiller, or one with a heat exchanger on the exterior of the housing, can provide for numerous and flexible uses. Any size reservoir, reaction vessels (to cool down or warm experiments), or circulator baths (to cool down or warm samples placed in the bath) can be used as well. Moreover, it is cheaper for researchers, clinicians or technicians to purchase various size reservoirs, circulating baths, etc., to use with one chiller than purchasing multiple chillers, separate circulator baths and an immersion cooler (used to cool down reactions). By housing the heat exchanger/evaporator outside the housing the disclosed chillers can in some embodiments be used in place of at least four pieces of equipment (circulating chillers, circulating baths, rotary evaporator condensers, and immersion coolers). Such a configuration provides significant advantages in cost savings and conservation of lab space.

In some embodiments, the disclosed chillers can improve cooling performance over existing cooling devices. For example, the cooling capability can be improved such as in applications that no longer require a coolant/circulating fluid, e.g. in rotary evaporators. In traditional chillers the coolant/circulating fluid is pumped through hoses from the chiller to the rotary evaporator condenser. Such coolant that is transported through these hoses can get warm, or at least warmer, by the time it reaches the condenser as it absorbs heat from the ambient surroundings. Such is not the case in the disclosed chiller designs.

Chiller apparatuses provided herein can in some embodiments comprise integrated cooling systems, such as for example a cooling system and a pump. Such chiller apparatus can further comprise a heat exchanger/evaporator positioned outside the housing of the compressor so that the heat exchanger/evaporator can be submerged or soaked in a reservoir or bath to remove heat from a liquid or medium within the reservoir or bath, or otherwise exposed to a coolant fluid, liquid, vapor or other cooling medium.

In some embodiments, the disclosed chillers can comprise a refrigeration system, including refrigeration lines, such as copper lines, through which refrigerant, e.g. chlorofluorocarbons, can pass, and a receiving tank, compressor, refrigeration condenser and dryer. The refrigeration lines can be connected to a heat exchanger in the condenser unit that provides a cooling surface for use in a water bath, reservoir, rotary evaporator or any other suitable environment desired to be cooled and capable of coming into contact with the heat exchanger. In some embodiments a cooling coil, which can be exposed, or in some embodiments concealed in a chemically-resistant vapor trap or sleeve made of titanium (including commercial pure grade titanium), stainless steel, metal alloys, plastic, glass, rubber, such as neoprene rubber, and/or combinations thereof, can be fluidly connected to the refrigeration lines. In some embodiments titanium is used in the sleeve due to its robust chemical resistance. The condenser unit in some embodiments can comprise a cooling coil chamber that is cooled by direct expansion of refrigerant in the refrigeration lines. In some embodiments, the heat exchanger can comprise a copper coil through which cooled refrigerant passes, and which is encased in a titanium sleeve. In some embodiments, the heat exchanger can comprise a coil that is double looped and not encased in a sleeve such that vapors or cooling media are exposed to an increased surface area on the cooled coils. In such embodiments the double coils can comprise stainless steel, titanium, and/or a combination thereof. In some embodiments, the chiller, including mechanical refrigeration system, can be mechanically linked to and fixed with the heat exchanger/condenser such that the two are provided in a single unitary device.

In some embodiments the heat exchanger can comprise a cooling coil in fluid communication with the refrigeration system. The heat exchanger can comprise a titanium sleeve surrounding the cooling coil, whereby the titanium sleeve is cooled by the cooling coil, wherein the environment, e.g. a cooling fluid in a water bath or evaporate from a rotary evaporator, around the titanium sleeve is cooled. The condenser can comprise metal alloy sleeve surrounding the cooling coil, whereby the metal alloy sleeve is cooled by the cooling coil.

In some aspects, a detachable reservoir, in some embodiments integrated with a pump or other means for providing a pressure/circulating capacity, can be provided. Such a reservoir can in some embodiments be attached to a pump hose or conduit at one end of the hose or conduit, and the other end of the hose or conduit to the reservoir at a point that liquid or cooling media in the reservoir can be pumped to systems be cooled.

In some aspects, each of the components above, including a compressor for the refrigeration system and a pump, can be integrated into one stand alone or all-in-one system with one or more heat exchangers/evaporators. Without a built-in reservoir or water bath such stand alone or all-in-one system chillers can be more compact than existing chiller systems. Such a compact configuration can make the disclosed chillers more portable and space saving.

A stand-alone chiller apparatus as disclosed herein can in some embodiments comprise one or more compressors, a condenser, a temperature controller, a receiver tank, an evaporator that can be positioned in a reservoir liquid or other vessels and configured to remove heat from a liquid or medium, an external reservoir or a vessel into which the evaporator can be positioned or submerged; and/or a pump or other mechanical apparatus to pump a cooled liquid or other medium in the reservoir to the systems to be cooled or for vacuum distillation.

In some embodiments, the heat exchanger/evaporator can be fitted with a condenser of a distillation apparatus like a rotary evaporator, such as for example that disclosed in U.S. Pat. No. 9,005,403, PCT International Application No. PCT/US2015/062615, published as International Publication No. WO 2016/086101, and PCT International Application No. PCT/US2016/036886, published as International Publication No. WO 2016/201223, each of which is incorporated herein by reference in their entirety. In yet other embodiments, the chiller apparatus can comprise an integrated vacuum pump and controller. In some aspects more than one rotary evaporator can be connected to one chiller.

In some embodiments, a cooling temperature range for the disclosed chillers can range from about +40° C. to about −45° C., about +40° C. to about −100° C., or about +40° C. to about −150° C. Desired temperatures can be achieved through refrigeration engineering and/or refrigerant selection.

Figure 1:
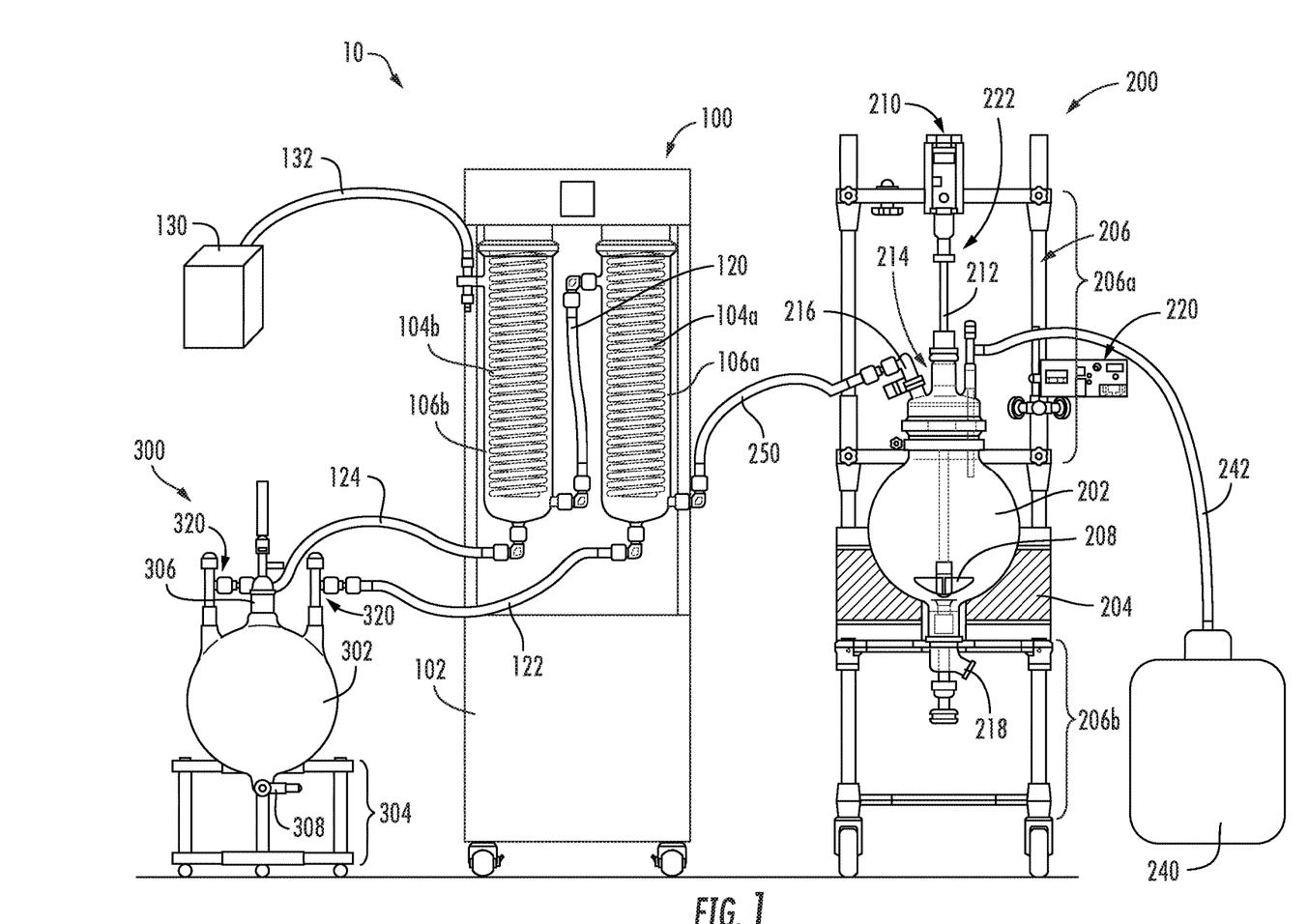
FIG. 1 is a schematic illustration of a rotary evaporation system as disclosed herein.

Turning now to the figures, FIG. 1 illustrates a rotary evaporation system 10, also referred to as a rotavap, or distillation system. Rotavap system 10 can in some embodiments, and as depicted in FIG. 1, include a chiller 100, vertical evaporator 200 and receiving unit 300. In some embodiment the rotavap system 10, including chiller 100, vertical evaporator 200 and receiving unit 300, is configured to be a high-capacity or high-volume distillation system as described further herein. As depicted in FIG. 1, chiller 100, vertical evaporator 200 and receiving unit 300 are configured to work together and/or be integrated in a series to function as one system, i.e. a rotavap system or distillation apparatus, to evaporate, condense and distill a composition.

To elaborate, vertical evaporator 200 can comprise an evaporator flask 202 at least partially surrounded by and/or adjacent to a heating element or mantle 204, both of which are mounted on a frame unit 206. Evaporator flask 202 is vertically or substantially vertically oriented, i.e. upright as opposed to angled. In some embodiments, evaporator flask 202 can comprise a large volume vessel, e.g. 6 L to 100 L, with an upper enclosure secured by way of a clamp mechanism. An overhead stirring mechanism 222, comprising an electric motor 210, drive shaft 212 and agitator 208 can be provided for agitating or stirring the contents of the evaporating flask 202. A conduit of vapor tube 250 can be provided to transfer the evaporate or vapor to the one or more condensers on a chiller 100. Feedstock container 240 can be positioned proximate to vertical evaporator 200 and configured to provide an extract, sample or composition to be distilled. A controller 220 can be provided to control and/or automate functionalities of vertical evaporator 200, including for example controlling and/or regulating the speed of the overhead stirring mechanism 222 and/or the heating element 204.

Figure 2:
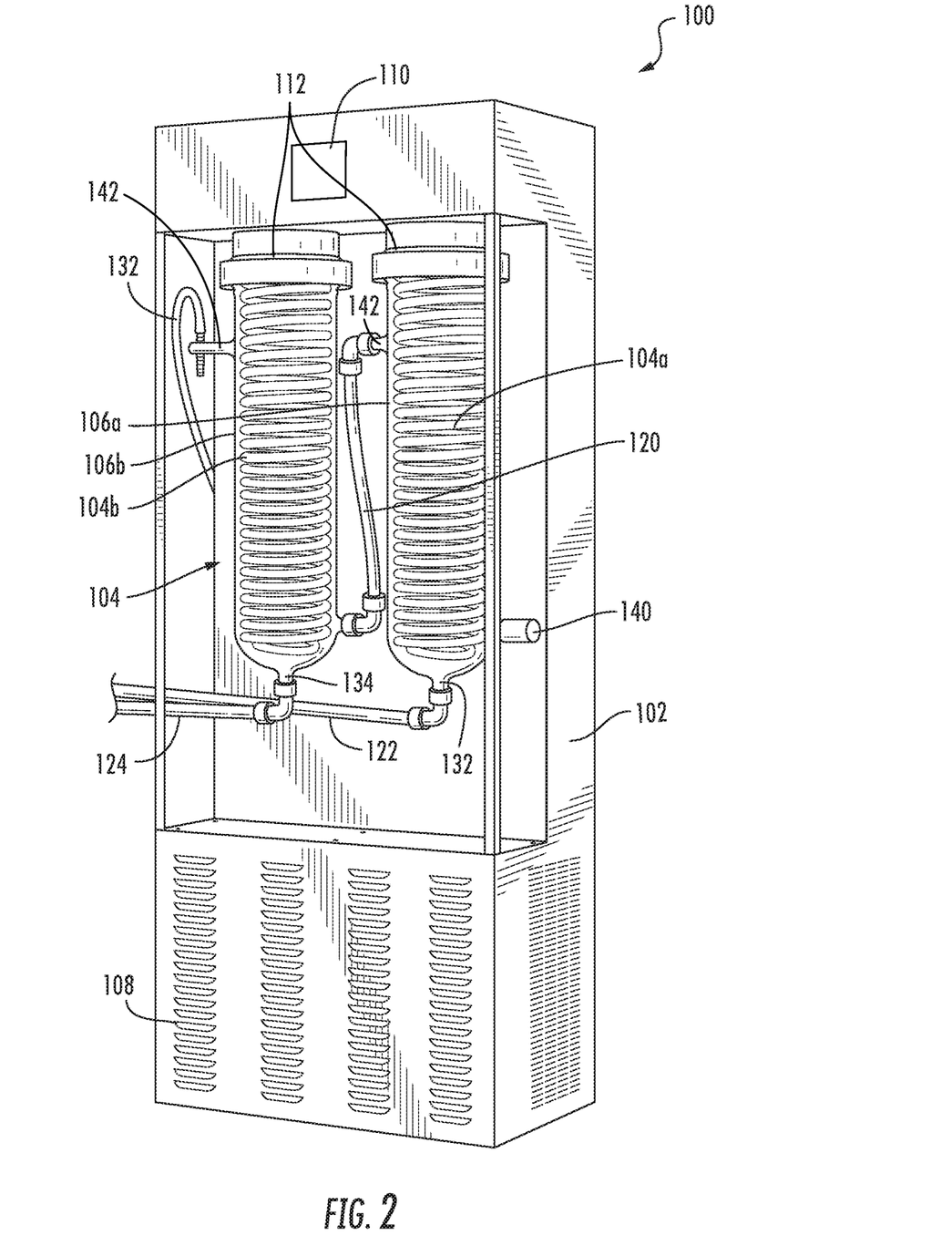
FIG. 2 is a schematic illustration of a stand-alone chiller as disclosed herein.

Continuing with FIG. 1, large-scale multifunctional chiller 100 is in some embodiments a component of rotary evaporation system 10. Chiller 100 can comprise a housing 102 with a heat exchanger 104 connected to but extending from housing 102. In some embodiment chiller 100 can comprise one, two, three, four or more heat exchangers, including for example two heat exchangers 104a and 104b as shown in FIG. 2. Heat exchangers 104a and 104b can in some embodiments be connected in series by vapor line 120, i.e. a hose or other conduit for passing an evaporate from one heat exchanger 104a to another heat exchanger 104b. One or more ports can be provided to allow attachment of one or more conduits or additional instruments/vessels to act as inlets/outlets for compounds/fluids to be cooled and/or condensed (See, e.g. FIG. 2 for further details). For example, vapors produced by vertical evaporator 200 can pass through conduit 250 and into sleeve 106a to come into contact with heat exchange coils 104a to thereby cool/condense the compounds, vapors or fluids. Any vapors not condensed can pass into any further heat exchanger in series, e.g. heat exchanger 104b where such vapors have a further opportunity to be cooled and condensed. The condensate can pass through drain ports and out corresponding drain lines to a collection flask 300, as described further below. A vacuum 130 can in some embodiments also be provided to create a vacuum or negative pressure inside the system, including for example inside heat exchangers 104a/104b, vertical evaporator 200 and/or collection vessel 300.

Collection or receiving unit 300 can in some embodiments comprise a collection flask 302, a frame or support structure 304 for securing and/or holding collection flask 302 and a manifold 306. Collection flask 302 can comprise a glass or polymer container, or other suitable material, in some embodiments in a round-bottom or pear-shaped configuration. collection flask 302, a frame or support structure 304.

In some embodiments, rotary evaporation system 10 or distillation system can comprise a footprint or operational area defined by the length L, width W, and/or combination thereof (area in square inches for example) of the outer dimensions of the apparatus/system, e.g. the distance across the front of each of chiller 100, vertical evaporator 200 and receiving unit 300 as assembled together in FIG. 1, by the width (or depth) of they assembled system. In some embodiments the height H of the system can also be factored into calculating a total footprint of the system, including for example the height of the tallest component(s). By way of example and not limitation, the presently disclosed chiller apparatuses rotary evaporation system 10, as shown in FIG. 1, can in some embodiments comprise a total footprint or operational area of about 60×66×20 inches (L×H×W), for a 22 liter system, about 70×66×30 inches (L×H×W), for a 50 liter system, about 70×72×30 inches (L×H×W), for a 72 liter system, or about 80×83×40 inches (L×H×W), for a 100 liter system.

FIG. 2 is a perspective view of a large-scale multifunctional chiller 100 as disclosed herein. Such a chiller can in some embodiments be used as part of, or a component of, a rotary evaporation system 10 or distillation system, as shown in FIG. 1. Chiller 100 can comprise a housing 102 with a heat exchanger 104 connected to but extending from housing 102. In some embodiment chiller 100 can comprise one, two, three, four or more heat exchangers, including for example two heat exchangers 104a and 104b as shown in FIG. 2. Heat exchangers 104a and 104b can in some embodiments be connected in series by vapor line 120, i.e. a hose or other conduit for passing an evaporate from one heat exchanger 104a to another heat exchanger 104b.

Chiller 100, and internal components discussed below, can be configured in such as way as to be integrated into a single device or apparatus that is configured to arrange the elements in such a way that provides for an effective and efficient cooling/chilling system, even for a high-capacity or large scale version, while minimizing the operational area and/or footprint.

Housing 102 can comprise a substantially rectangular or square or other suitable shape, box-like structure with four sides, a top and bottom. Housing 102 can be configured to fully, or substantially fully, enclose the mechanical or working components of chiller 100. Heat exchangers 104a/104b can be substantially enclosed within an outer periphery of housing 102, or can be arranged to extend away from housing 102. Manifold 112 can support and mechanically connect heat exchanger 104a/104b to chiller 100. Manifold 112 can comprise a clamp or other attachment mechanism, e.g. threads, screws, bolts, pressure fitting, etc. for securing heat exchanger 104a/104b. In some embodiments housing 102 can comprise a sheet metal or other suitable material, e.g. plastic, fiberglass, aluminum, etc., sufficiently rigid to maintain its structure and encase chiller 100, and also withstand extended use in a laboratory or field setting.

In some embodiments housing 102 can optionally comprise ventilation grates 108, louvers or other suitable ventilation structures configured to permit air circulation within the interior of housing 102 and around the refrigeration system housed therein. In some aspects chiller 100 can also comprise a control panel 110 conveniently located, such as on an outer surface of housing 102, such that a user can manipulate control panel 110 to facilitate operation of chiller 100. Control panel 110 can in some embodiments comprise a touch-screen or other electronic controller. Control panel 110 can in some embodiments comprise a temperature controller configured to control and/or regulate a temperature of a medium and/or the heat exchanger.

Chiller 100 can comprise an integrated refrigeration system housed within housing 102 and continuing through heat exchanger 104a/104b to provide a cooled refrigerant to heat exchanger 104a/104b, also referred to as heat exchanger coils. For example, chiller 100 can comprise a compressor, refrigeration condenser and fan. In some embodiments a refrigeration dryer may also be included. In some embodiments a compressor, a refrigeration condenser and a heat exchanger coil, e.g. heat exchanger 104a/104b (and optionally dryer) can be connected by refrigeration lines (copper tubing) by feeding through manifold 112. Heat exchanger 104a/104b can comprise single or double coiled lines connected to refrigeration lines fed through manifold 112. Thus, refrigeration coolant can pass through the refrigeration system (e.g. compressor, refrigeration condenser) and into the coiled lines of heat exchanger 104a/104b in a closed or continuous circuit such that heat absorbed by heat exchanger 104a/104b from a surrounding media, e.g. cooling liquid or vapors, can be removed by the refrigeration system to thereby cool the surrounding media. In some embodiments chiller 100 can comprise one or more heat exchangers to increase the cooling capacity and ability to use the same chiller for multiple applications simultaneously. In some embodiments the one or more heat exchangers can be adapted to run off of the same refrigeration system.

By way of example and not limitation, heat exchanger 104a/104b, as depicted in FIG. 2, can each comprise a sleeve 106a/106b, where each sleeve 106a/106b comprises a single-walled enclosure surrounding and enclosing coils 104a/104b. Single-walled sleeves 106a/106b can in some embodiments comprise a glass canister configured to slide over heat exchanger coils 104a/104b and securely attach to housing 102 via manifold 112 to create a sealed enclosure. Manifold 112 can include a collar or other securing element, e.g. threads, screws, bolts, pressure fitting, etc. as discussed herein. One or more ports 132, 134, and/or 142 can be provided to allow attachment of one or more conduits or additional instruments/vessels to act as inlets/outlets for compounds/fluids to be cooled and/or condensed. For example, compounds, vapors or fluids entering sleeve 106a can come into contact with heat exchange coils 104a, or a cooling sleeve surrounding the coils, to thereby cool the compounds, vapors or fluids. Any vapors not condensed can pass into any further heat exchanger in series, e.g. heat exchanger 104b shown in FIG. 2, by port 142 and line 120 into port 140 on sleeve 106a where such vapors have a further opportunity to be cooled and condensed. The condensate can pass through drain ports, e.g. ports 132 and/or 134, and out corresponding drain lines, e.g. lines 122 and/or 124, to a collection flask (see, e.g. FIG. 1).

A vacuum port 142 can in some embodiments be provided (in some cases near the top) and configured to receive a vacuum line 132 from a vacuum pump to thereby cause a vacuum on the inner environment of sleeves 106a/106b.

As depicted in FIG. 1 for example, a heat exchanger system can comprise coiled lines 104a/104b which can be connected to refrigeration lines through which cooled refrigerant can pass. Heat exchanger coiled lines 104a/104b can have an incoming line for receiving a flow of chilled coolant or refrigerant to pass through the coils, and an outgoing line configured as a conduit for the outgoing coolant or refrigerant after having passed through the coils and acting as a heat exchanger. The incoming line and outgoing line are configured to be connected to the integrated refrigeration system of the chiller as disclosed herein. Heat exchanger coiled lines 104a/104b are illustrated as a single looped coil in FIG. 1, but can also comprise in some embodiments double, triple or more coils. An effect of coiling the refrigerant lines of heat exchanger coiled lines 104a/104b is to increase the surface area for cooling a medium in contact with the coils or in contact with a surface proximate to the coils. Thus, doubling or tripling, for example, the coils in some embodiments can increase cooling capacity of a heat exchanger. Coiled lines 104a/104b can be configured to complete a continuous loop along with the refrigeration system of the chiller. Coiled lines 104a/104b can be made from a copper tubing material in some embodiments, or alternatively stainless steel, or other suitable metal alloys such as titanium. In some embodiments coils 104a/104b can comprise a titanium material with an inner coating of copper. In some embodiments coils 104a/104b can comprise stainless steel, titanium, and/or a combination thereof.

In some embodiments the condensers, or heat exchanger coils 104a/104b, can comprise an evaporator coil comprising a titanium alloy, stainless steel and/or copper pipe. While in some embodiments heat exchanger coils 104a/104b can be exposed for direct cooling of a medium or evaporate (vapor), in some embodiments, stainless steel coil, can be coated with perfluoroalkoxy alkanes (PFA) for additional chemical corrosion protection. With the inclusion of a PFA, or other protective coating, a wide range of metals or materials can be used in the coils since corrosion can be substantially reduced and/or eliminated. In some embodiments, heat exchanger coils 104a/104b can be coated with any chemical resistant polymer or material, including for example a fluoropolymer. In some aspects, such a fluoropolymer can include for example Halar® ECTFE, a copolymer of ethylene and chlorotrifluoroethylene (Solvay Group, Belgium).

Figure 3:
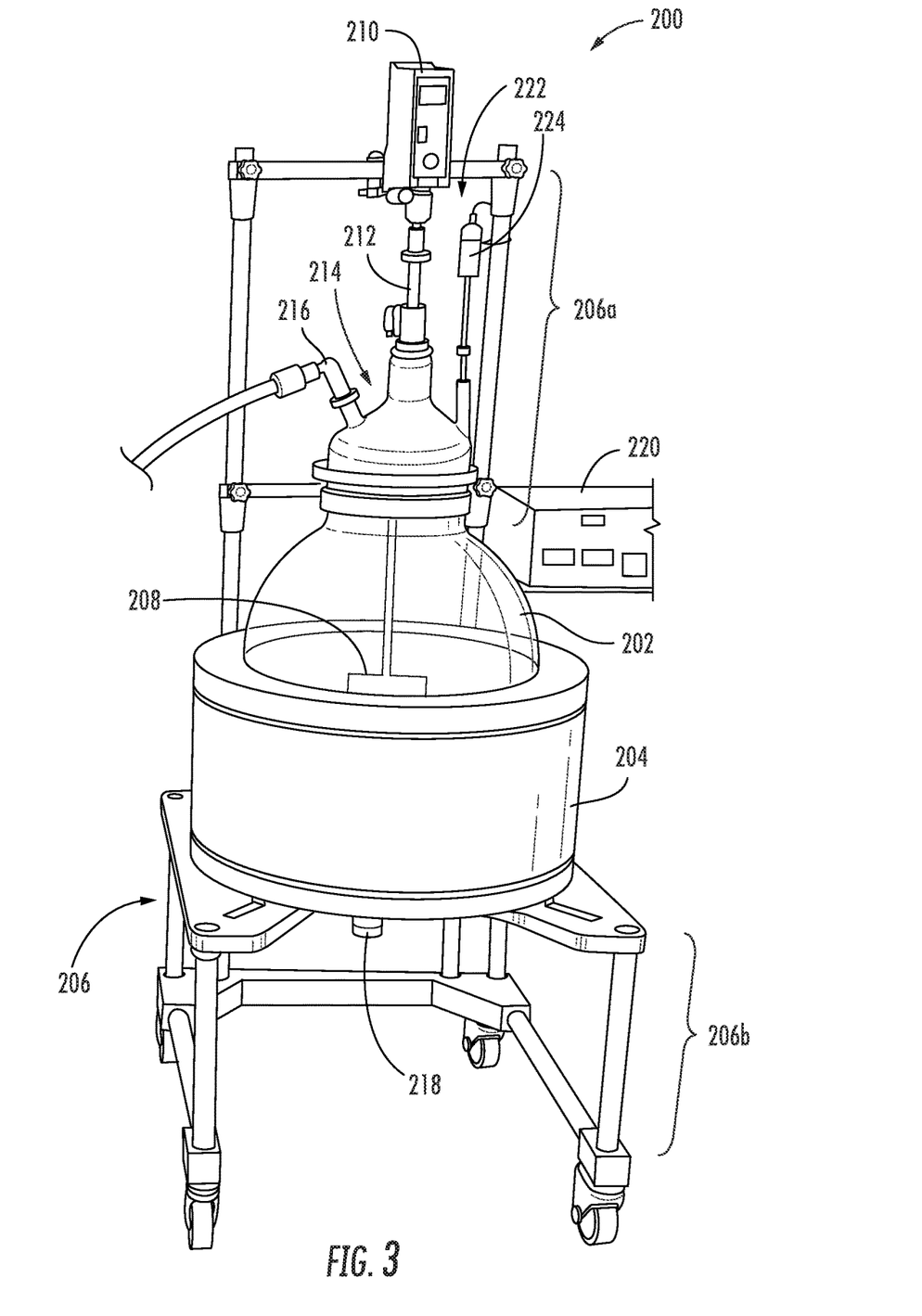
FIG. 3 is a schematic illustration of a vertical evaporation system as disclosed herein.

FIG. 3 illustrates a vertical evaporator 200, in some embodiments configured as a high-speed or high-capacity vertical evaporator 200 capable of evaporating significantly greater quantities of sample or extract than existing evaporative systems due to its configuration and design. Existing rotary evaporators, or rotavaps, use round bottom, or pear shaped flasks oriented at an angle to allow for heating of the contents of the flask to thereby vaporize the same. Applicant has discovered a more efficient and effective approach using an upright vessel configured to engage a heating mantle.

To elaborate, vertical evaporator 200 can comprise an evaporator flask 202 at least partially surrounded by and/or adjacent to a heating element or mantle 204, both of which are mounted on a frame unit 206. Evaporator flask 202 is vertically or substantially vertically oriented, i.e. upright as opposed to angled. In some embodiments, evaporator flask 202 can comprise a large volume vessel, e.g. 6 L to 100 L, with an upper enclosure secured by way of a clamp mechanism. An overhead stirring mechanism 222, comprising an electric motor 210, drive shaft 212 and agitator 208 can be provided for agitating or stirring the contents of the evaporating flask 202. A conduit of vapor tube 250 can be provided to transfer the evaporate or vapor to the one or more condensers on a chiller 100. Feedstock container 240 can be positioned proximate to vertical evaporator 200 and configured to provide an extract, sample or composition to be distilled. A controller 220 can be provided to control and/or automate functionalities of vertical evaporator 200, including for example controlling and/or regulating the speed of the overhead stirring mechanism 222 and/or the heating element 204.

Overhead stirring mechanism 222 can be provided for agitating or stirring the contents, e.g. extra, sample, composition, etc., of the evaporating flask 202. Electric motor 210 can in some aspects be mounted on frame 206 and aligned directly or substantially above evaporating flask 202 such that drive shaft 212 extends vertically downward through an upper portion of evaporating flask 202. Drive shaft 212 can extend into the interior of evaporating flask 202, in some embodiments, substantially toward the bottom of the interior of evaporating flask 202, and can terminate with an agitator 208. Agitator 208 can comprise a paddle, propeller, blade or other structure suitable for stirring, agitating and/or mixing the contents of evaporating flask 202 to be evaporated. Drive shaft 212, directionally and mechanically connected to both electric motor 210 and agitator 208 translates a rotational force from the electric motor 210 to the agitator 208. As such, overhead stirring mechanism 222, comprising an electric motor 210, drive shaft 212 and agitator 208, can allow for a more rapid evaporation of the contents of evaporating flask 202 since the flask can be heated more evenly and at a higher temperature. The speed or rate at which the sample or extract is evaporated can be significantly increased as compared to a rotavap using a traditional angles flask rotating in a water bath. Thus, with the disclosed system there is no need to rotation the evaporating flask 202.

Instead, evaporating flask 202 is nested within heating mantle 204, in some embodiments in direct contact with heating mantle to thereby efficiently transfer heat from heating mantle 204 to flask 202. Thus, in some aspects heating mantle 204 can comprise a substantially cylindrical housing with an inner bowl-shaped heating element configured to match the size and shape of evaporating flask 202 so as to stably contain evaporating flask 202 and efficiently heat the same. Heating mantle 204 can be mounted on a frame 206 or similar structure.

Frame 206 can comprise a lower portion 206b configured to securely hold in place heating mantle 204, and upper portion 206a extending vertically from lower portion 206b and configured to hold and position overhead stirring mechanism 222 above heating mantle 204 and/or evaporating flask 202. Frame 206 can further comprise wheels or casters to provide mobility. Frame 206 can be advantageous in that it can lift and align the evaporating flask 202, particularly with heavy large volume evaporating flask, e.g. 22 liters to 100 liters.

In some aspects a manifold 214 can be provided to enclose an opening on the top portion of evaporating flask 202 and collect evaporates from evaporating flask 202. Manifold 214 can be configured to allow drive shaft 212 to pass therethrough while maintaining an air-tight or substantially air-tight seal. Port 216 can be provided, along with any number of other ports or access points, in manifold 214 to allow captured evaporates to pass from evaporating flask 202 and into the chiller/condenser via a conduit or hose.

In some embodiments, and as shown in FIG. 3 as well as FIG. 1, a drain valve 218 can be provided in the evaporating flask. This is an advantage over existing round bottom flasks that cannot be drained while in place. Moreover, a sample/addition valve 224 can be provided at the top and/or in manifold 214 for the addition of substances and/or taking of samples from the flask. With one or both of the draining and/or filling ports the fully integrated system can in some embodiments be operated continuously. That is, with a filling port and/or draining port the system can be continuously operated.

The disclosed vertical evaporator 200 allows for the replacement of a water bath as required by round bottom flasks with a heating mantle 204 for efficient and faster heating.

Figure 4:
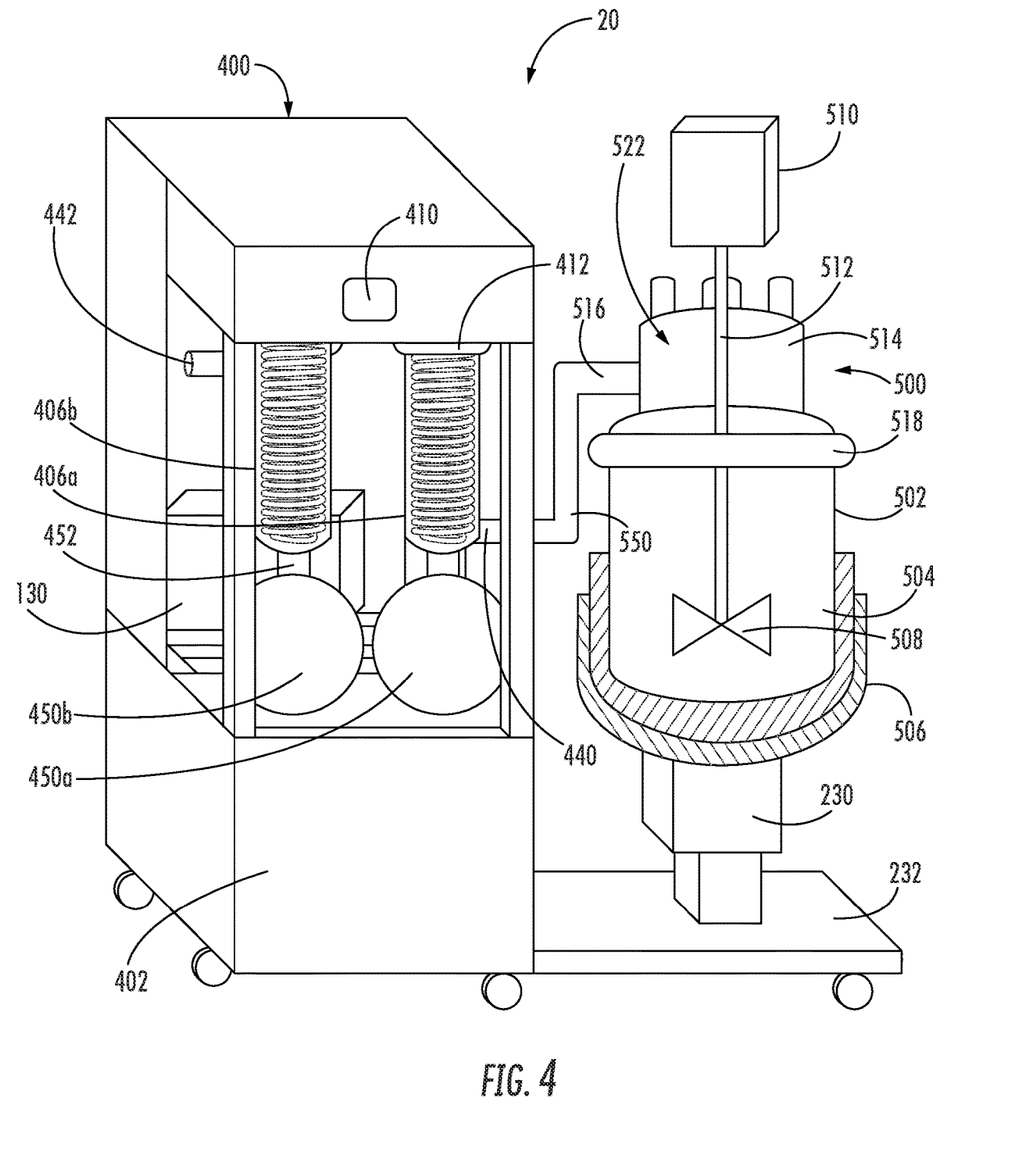
FIG. 4 is a schematic illustration of a fully integrated rotary evaporation and/or distillation system as disclosed herein.
Figure 5:
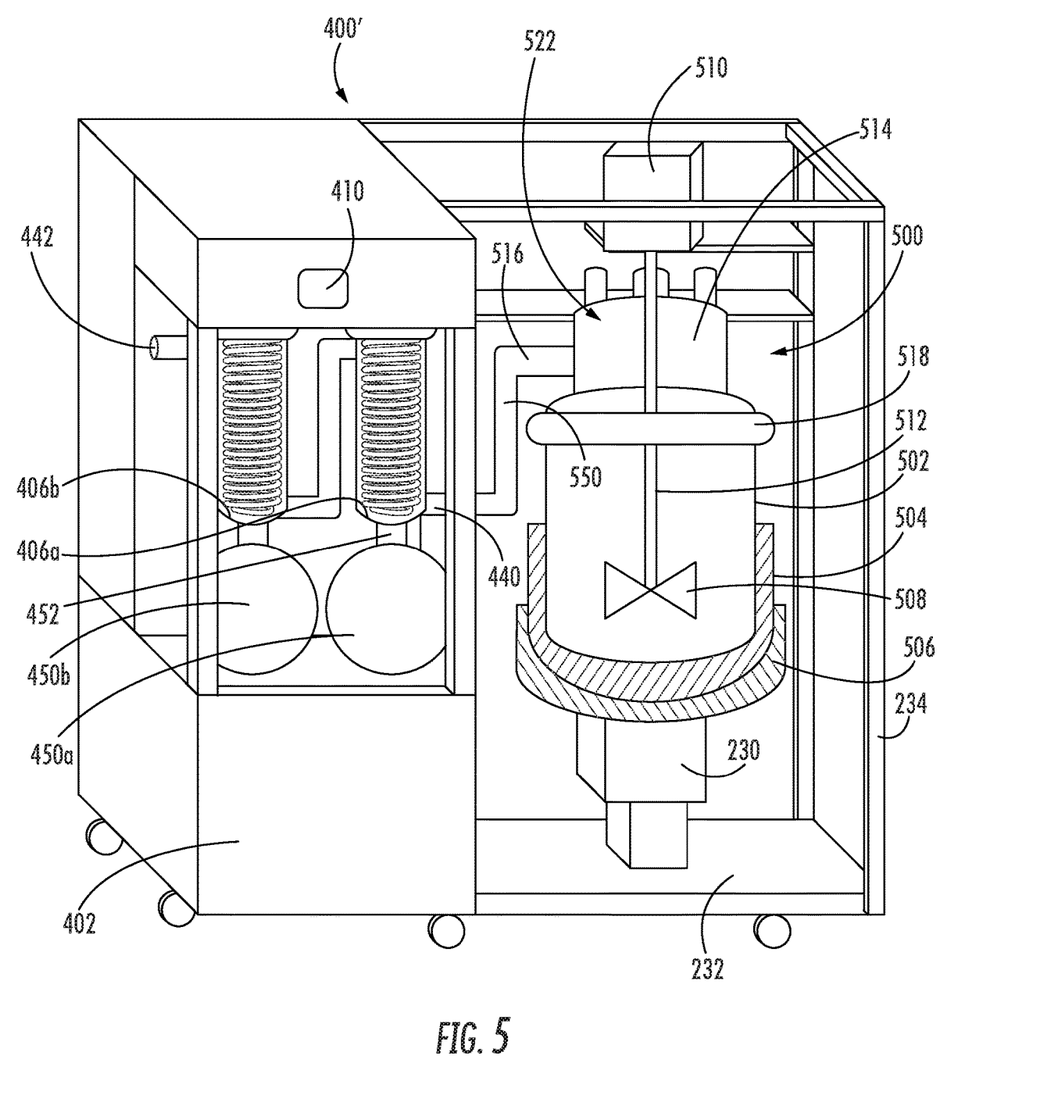
FIG. 5 is a schematic illustration of a fully integrated rotary evaporation and/or distillation system as disclosed herein.

Although depicted as a vertically aligned round-bottom flask in FIGS. 1 and 3, in some embodiments evaporating flask 202 can be any shape or suitable configuration, including for example a substantially cylindrical beaker-like vessel as shown in FIGS. 4 and 5, and discussed further hereinbelow.

At least one advantageous aspect of the disclosed rotavap system is the vertical orientation of the evaporating flask. That is, the instant rotary evaporation system is configured with a vertically, or substantially vertically oriented evaporation flask, as opposed to an angled or diagonal evaporation flask as in traditional rotovaps. This vertical orientation also allows for high speed stirring of the contents, thereby resulting in high speed evaporation. For example, the evaporation flask contents can be stirred by an overhead stirrer at about 500 to about 6,000 revolutions per minute (rpm). This is in contrast to a traditional system that rotates the round bottom flask at about 300 rpm or less. The design of the disclosed rotavap system allows for a significantly larger volume of sample to be processed, i.e. distilled in a much shorter amount of time due to its design and configuration, including for example the vertically oriented evaporation system with internal stirring mechanism that can be stirred and evaporated at high speed. The absence of having to rotate the evaporation flask removes a significant impediment in existing systems in the speed and volume they are able to handle.

An evaporate or vapor that comes into contact with the heat exchanger, and particularly coils 104a/104b, can condense into a liquid and pass through drain ports, e.g. ports 132 and/or 134, and out corresponding drain lines, e.g. lines 122 and/or 124, to a collection or receiving unit 300 (see FIGS. 1 and 2). In some embodiments one or more joints 320 can be positioned on conduits or drain lines 122 and/or 124 that can be configured to allow for easy removal of a collection unit (receiving unit) 300, and in some aspects removal without breaking a vacuum to the system during operation. Such joint 320 can comprise a valve to maintain the vacuum while removing collection flask 302 from receiving unit 300.

Collection or receiving unit 300 can in some embodiments comprise a collection flask 302, a frame or support structure 304 for securing and/or holding collection flask 302 and a manifold 306. Collection flask 302 can comprise a glass or polymer container, or other suitable material, in some embodiments in a round-bottom or pear-shaped configuration, or any other suitable configuration. Additional access ports, for taking samples or adding components, can be included on collection flask 302 as depicted in FIG. 1.

In some embodiments the large scale, high-speed rotavap systems and devices disclosed herein further comprise an intelligent cooling capacity configured to adapt the cooling capacity to the heat load applied to the chiller. Thus, using FIG. 1 as an example, in some embodiments the heat load provided by evaporator 200 can be detected and used to calibrate the cooling capacity needed to be provided by chiller 100. Thus, the cooling capacity provided by chiller 100 can be adapted, or proportionally applied, to the heat load delivered by evaporator 200. The heat load can be defined as the amount of evaporate, or vapor, or evaporated/vaporized sample coming from evaporator 200 via conduit 250. In some embodiments such an intelligent cooling system can comprise an expansion valve configured to increase or decease the cooling capacity of the chiller, and particularly the heat exchanger coils, e.g. coils 104a/104b of FIG. 1, proportional to the heat load delivered by the evaporator. In some embodiments the expansion valve can be digitized, and in some embodiments in electrical communication with a computerized controller.

The components of a large scale, high-speed rotavap system as disclosed herein can be oriented or configured as depicted in FIGS. 1 through 3, but can also be configured in alternative arrangements such as depicted in FIGS. 4 and 5. By way of example and not limitation, FIGS. 4 and 5 show fully integrated rotavap and/or distillation systems 20 and 30, respectively, comprising a high-capacity chiller/condenser combined with a high-speed evaporation flask/system with a stirring mechanism. Rotavap systems 20 and 30 can be contained in a single unit and/or housed within a structural frame and/or enclosed for additional safety as needed. A fully enclosable system, such as depicted in FIG. 5, can contain all of the chemicals and evaporates to provide an additional measure of safety for technicians using the equipment.

In FIGS. 4 and 5 rotary evaporation systems 20 and 30, also referred to as a rotavap, or distillation system, can in some embodiments include a chiller/condenser 400 and a vertical evaporator 500. In some embodiment the rotavap system 10, including chiller/condenser 400 and a vertical evaporator 500, is configured to be a high-capacity or high-volume distillation system as described further herein. As depicted in FIGS. 4 and 5, chiller/condenser 400 and a vertical evaporator 500 are configured to work together and/or be integrated in a series to function as one system, i.e. a rotavap system or distillation apparatus, to evaporate, condense and distill a composition.

To elaborate, vertical evaporator 500 can comprise an evaporator flask 502 at least partially surrounded by and/or adjacent to a heating element or mantle 504, both of which are mounted on a base unit 230. Evaporator flask 502 is vertically or substantially vertically oriented, i.e. upright as opposed to angled. In some embodiments, evaporator flask 502 can comprise a large volume vessel, e.g. 6 L to 100 L, with an upper enclosure 514 (or manifold) secured by way of a clamp mechanism 518. An overhead stirring mechanism 522, comprising an electric motor 510, drive shaft 512 and agitator 508 can be provided for agitating or stirring the contents of the evaporating flask 502. A conduit of vapor tube 550 can be provided to transfer the evaporate or vapor to the one or more condensers on a chiller 400. A feedstock container can be positioned proximate to vertical evaporator 500 and configured to provide an extract, sample or composition to be distilled (see FIG. 1). A controller can be provided to control and/or automate functionalities of vertical evaporator 500, including for example controlling and/or regulating the speed of the overhead stirring mechanism 522 and/or the heating element 504.

Continuing with FIGS. 4 and 5, large-scale multifunctional chiller 400 can comprise a housing 402 with a heat exchanger 404 connected to but extending from housing 402. In some embodiment chiller 400 can comprise one, two, three, four or more heat exchangers, including for example two heat exchangers 404a and 404b as shown in FIGS. 4 and 5. Heat exchangers 404a and 404b can in some embodiments be connected in series by vapor line, i.e. a hose or other conduit for passing an evaporate from one heat exchanger 404a to another heat exchanger 404b. One or more ports can be provided to allow attachment of one or more conduits or additional instruments/vessels to act as inlets/outlets for compounds/fluids to be cooled and/or condensed (See, e.g. FIG. 2 for further details). For example, vapors produced by vertical evaporator 500 can pass through conduit 550 and into sleeve 406a to come into contact with heat exchange coils 404a to thereby cool/condense the compounds, vapors or fluids. Any vapors not condensed can pass into any further heat exchanger in series, e.g. heat exchanger 404b where such vapors have a further opportunity to be cooled and condensed. The condensate can pass through drain ports and out corresponding drain lines to a collection flasks 450a and 450b. A vacuum 430 can in some embodiments also be provided to create a vacuum or negative pressure inside the system, including for example inside heat exchangers 404a/404b, vertical evaporator 500 and/or collection flasks 450a and 450b. As shown in FIG. 4, vacuum 430 can in some embodiments be contained within housing 402 such that all components of rotavap system 20/30 is contained in a single unit. Alternatively, an exterior vacuum source could be used and connected to vacuum port 442, as needed and as shown in other embodiments herein.

Collection or receiving units/flasks 450a and 450b can in some embodiments comprise a collection flask or other suitable container or vial, e.g. a glass or polymer container, or other suitable material, in some embodiments in a round-bottom or pear-shaped configuration, for collecting condensate from heat exchangers 404a/404b. As depicted in FIGS. 4 and 5, such collection or receiving units/flasks 450a and 450b can extend directly from the heat exchangers via a conduit or connection 452, or can be external from the main unit as depicted in FIG. 1. However, in the embodiments of FIGS. 4 and 5, collection or receiving units/flasks 450a and 450b can be positioned to be contained within housing 402 so as to provide a fully contained stand-alone rotavap unit.

Continuing with FIGS. 4 and 5, vertical evaporator 500 can comprise an evaporator flask 502 having a substantially cylindrical shape, or flask-like shape, that is configured to nest within or otherwise be surrounded by and/or adjacent to heating element or mantle 504. Heating element 504 can be continued within housing 506, which can be mounted on a base unit 230. Base unit 230 can be supported by floor 232, which can be integrally joined with housing 402 of chiller/condenser 400 so as to provide all components on one fully contained stand-alone unit. Base unit 230 can in some embodiments comprise an adjustable functionality or adjustable member, e.g. vertically raised and lowered, so as to allow for adjustability of the height of high-speed evaporator 500. Such adjustability can provide for the use of varying sizes of flasks 502 within the same rotavap system 20/30.

The rotavap system of FIG. 5 can in some embodiments comprise an additional framing/housing 234 configured to further contain the system, and particularly evaporator 500 within a single unit. Framing/housing 234 can further provide structural support for an enclosure material, e.g. glass, Plexiglas, composite materials, etc., to fully enclose the evaporation and distillation system for both safety and environmental security purposes.

Figure 6:
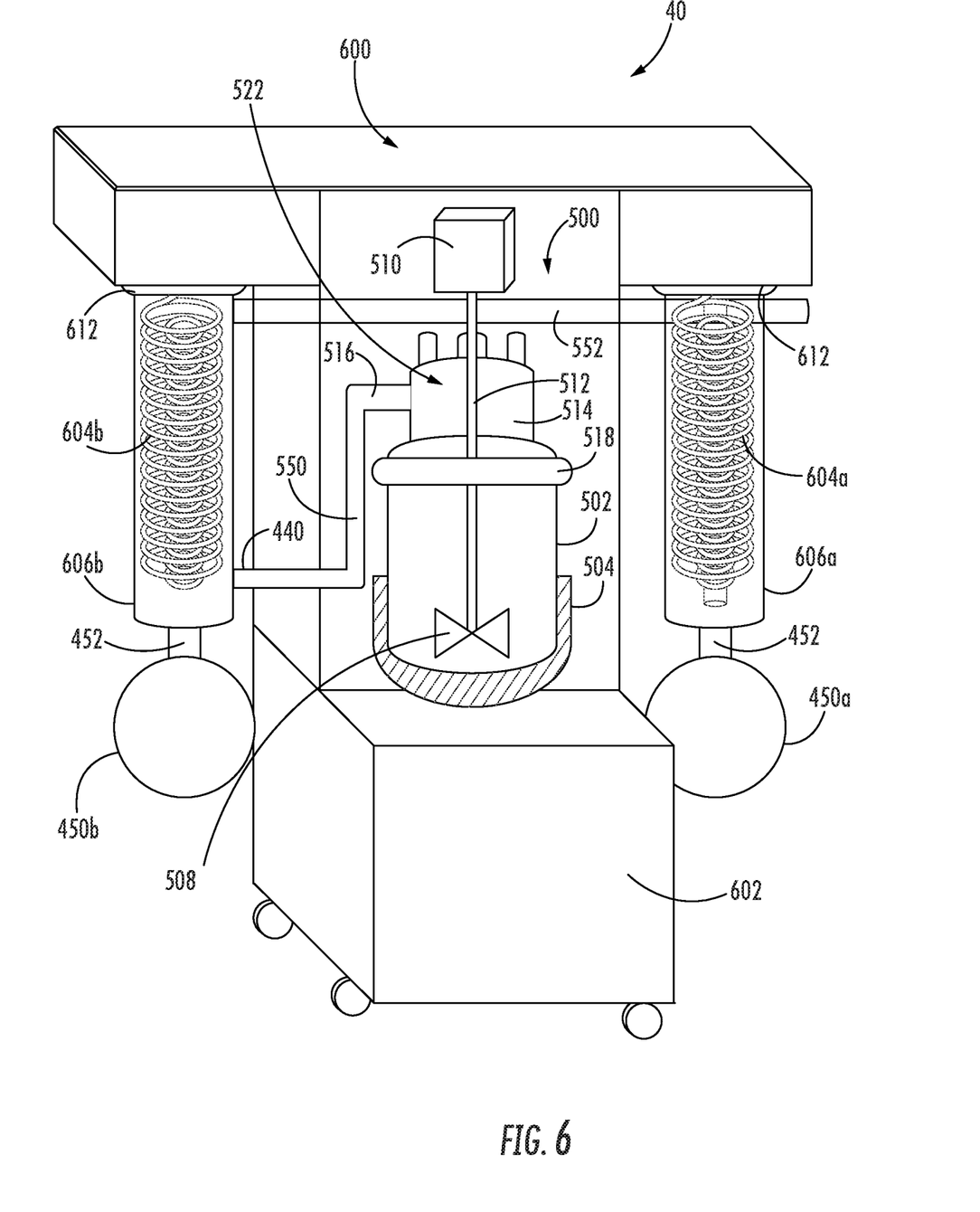
FIG. 6 is a schematic illustration of a fully integrated rotary evaporation and/or distillation system as disclosed herein.

By way of example and not limitation, FIG. 6 illustrates yet another embodiment of a fully integrated rotavap and/or distillation system 40, comprising a high-capacity chiller/condenser 600 combined with a high-speed vertical evaporation flask/system 500 with a stirring mechanism. Rotavap systems 20 and 30 can be housed within a structural frame and/or enclosed for additional safety as needed.

The components of a large scale, high-speed rotavap system as disclosed herein can be oriented or configured as depicted in FIGS. 1 through 5, but can also be configured in alternative arrangements such as depicted in FIG. 6. By way of example and not limitation, FIG. 6 shows a fully integrated rotavap and/or distillation system 40 comprising a high-capacity chiller/condenser combined with a high-speed evaporation flask/system with a stirring mechanism. Rotavap system 40 can be contained in a single unit and/or housed within a structural frame and/or enclosed for additional safety as needed.

In FIG. 6 rotary evaporation system 40, also referred to as a rotavap, or distillation system, can in some embodiments include a chiller/condenser 600 and a vertical evaporator 500. In some embodiment the rotavap system 40, including chiller/condenser 600 and a vertical evaporator 500, is configured to be a high-capacity or high-volume distillation system as described further herein. As depicted in FIG. 6, chiller/condenser 600 and a vertical evaporator 500 are configured to work together and/or be integrated in a series to function as one system, i.e. a rotavap system or distillation apparatus, to evaporate, condense and distill a composition.

To elaborate, vertical evaporator 500 can comprise an evaporator flask 502 mounted centrally on the main housing of chiller/condenser 600, and at least partially surrounded by and/or adjacent to a heating element or mantle 504. Evaporator flask 502 is vertically or substantially vertically oriented, i.e. upright as opposed to angled. In some embodiments, evaporator flask 502 can comprise a large volume vessel, e.g. 6 L to 100 L, with an upper enclosure 514 (or manifold) secured by way of a clamp mechanism 518. An overhead stirring mechanism 522, comprising an electric motor 510, drive shaft 512 and agitator 508 can be provided for agitating or stirring the contents of the evaporating flask 502. A conduit of vapor tube 550 can be provided to transfer the evaporate or vapor to the one or more condensers on chiller 600. A feedstock container can be positioned proximate to vertical evaporator 500 and configured to provide an extract, sample or composition to be distilled (see FIG. 1). A controller can be provided to control and/or automate functionalities of vertical evaporator 500, including for example controlling and/or regulating the speed of the overhead stirring mechanism 522 and/or the heating element 504.

Continuing with FIG. 6, large-scale multifunctional chiller 600 can comprise a housing 602 with a heat exchanger 604 connected to but extending from housing 602. In some embodiments chiller 600 can comprise one, two, three, four or more heat exchangers, including for example two heat exchangers 604a and 604b as shown in FIG. 6. Heat exchangers 604a and 604b can in some embodiments be connected in series by vapor line 552, i.e. a hose or other conduit for passing an evaporate from one heat exchanger 604a to another heat exchanger 604b. One or more ports can be provided to allow attachment of one or more conduits or additional instruments/vessels to act as inlets/outlets for compounds/fluids to be cooled and/or condensed (See, e.g. FIG. 2 for further details). For example, vapors produced by vertical evaporator 500 can pass through conduit 550 and into sleeve 606a to come into contact with heat exchange coils 604a to thereby cool/condense the compounds, vapors or fluids. Any vapors not condensed can pass into any further heat exchanger in series, e.g. heat exchanger 604b where such vapors have a further opportunity to be cooled and condensed. The condensate can pass through drain ports and out corresponding drain lines to a collection flasks 450a and 450b. A vacuum can in some embodiments also be provided to create a vacuum or negative pressure inside the system, including for example inside heat exchangers 604a/604b, vertical evaporator 500 and/or collection flasks 450a and 450b. As shown in FIG. 4, a vacuum can in some embodiments be contained within the rotavap housing, e.g. housing 602, such that all components of rotavap system 40 is contained in a single unit. Alternatively, an exterior vacuum source could be used and connected to a vacuum port as described further herein.

Collection or receiving units/flasks 450a and 450b can in some embodiments comprise a collection flask or other suitable container or vial, e.g. a glass or polymer container, or other suitable material, in some embodiments in a round-bottom or pear-shaped configuration, for collecting condensate from heat exchangers 604a/604b. As depicted in FIG. 6, such collection or receiving units/flasks 450a and 450b can extend directly from the heat exchangers via a conduit or connection 452, or can be external from the main unit as depicted in FIG. 1. However, in the embodiments of FIG. 6, collection or receiving units/flasks 450a and 450b can be positioned to be contained within and/or as part of the rotavap unit so as to provide a fully contained stand-alone rotavap unit.

Summarily, there are notable differences between existing rotavaps, particularly those with larger capacities, and the disclosed integrated and large capacity systems, are summarized below. For example, existing systems allow for rotation (spinning) of 20 L or 50 L glass flasks at a maximum speed of 100 rpm along an axis of rotation. This approach is a slow and inefficient process. Bumping (foaming) of a sample can often prevent maximizing vacuum pressure. Moreover, spinning a large flask with large volumes of chemicals is dangerous. Particularly, handling 5 L to 200 L round bottom flasks is problematic, and can lead to breaking and/or loss of product. Finally, heated water (e.g. a water bath) is needed to heat the flask in such systems.

In marked contrast, in the disclosed systems and apparatuses, no spinning of large flasks, e.g., 20 L, 50 L or 100 L, is needed. Instead, the large volume flasks in the disclosed systems are stationary. The sample (solvent) in the flask is stirred using an overhead stirrer at about 200 to about 6,000 rpm. With the disclosed design, bumping (foaming) is eliminated at high rpm. As such, vacuum pressure can be maximized, which speeds up the evaporation rate and shortens evaporation time. Since the flask is not rotated, cylindrical glassware that is equipped with an inlet and outlet for continuous sample filling and product draining, respectively, can be used. In such a system, flask volume can be as large as a 100 L cylindrical flask. Finally, no heated water, or water bath is needed in the disclosed system. Instead, non-liquid base heating, such as heating mantle or ceramic heating blocks, can be used. This approach is more efficient and reduces energy consumption.

The disclosed systems and apparatuses can be used for condensing and/or distilling compounds, compositions, samples and extracts. In some embodiments the disclosed systems and apparatuses, including the disclosed rotavaps, vertical evaporators and/or chillers can be used in conjunction with other equipment and systems requiring evaporation, condensation and/or chilling, including for example freeze dryers for lyophilizing samples. They can also be used with refrigerated condensing units/systems for cooling evaporated solvents without using a dry ice trap, a continuous flow of water, and/or a recirculating chiller. By using a mechanically refrigerated cooling/freezing system, or chiller, to provide a cool reservoir capable of condensing vapors arising from solvent evaporation the waste of a continuous flow of water can be avoided, and the use of dry ice and compatible solvents such as acetone and isopropyl alcohol can be avoided, both of which provide for a more environmentally friendly alternative to existing rotary evaporators. In some embodiments the disclose systems and apparatuses can be used with centrifugal concentrators for protein extraction and purification, DNA concentration, buffer exchange, and deproteinization. Likewise, in some embodiments the disclosed systems and devices can be used with gel dryers, DNA sample concentration, and/or acid sample concentrations In some embodiments the chillers, cooling devices and related apparatuses provided herein can be used in methods of cooling materials, liquids, vapors, evaporates and other mediums. By way of example and not limitation, methods are provided for condensing an evaporate, such as from a rotary evaporator, including providing a chiller, providing a rotary evaporator, evaporating a sample via the rotatory evaporator, and condensing the evaporate using a chiller and/or cooling system/apparatus as disclosed herein. As another example, a tankless chiller as provided herein can be used in a method of cooling a sample or reaction, including providing a tankless chiller, providing a separate water bath of a desired size and configuration suitable for the reaction cooling, and aligning the chiller (with external heat exchanger) and water bath such that the water bath is cooled by the chiller to thereby cool the sample/reaction. Similar methods using the disclosed cooling systems and accompanying laboratory/research equipment, as would be appreciated and understood by one of ordinary skill in the art, are provided herein.

While the following terms are believed to be well understood by one of ordinary skill in the art, the following definitions are set forth to facilitate explanation of the presently disclosed subject matter.

Unless defined otherwise, all technical and scientific terms used herein have the same meaning as commonly understood to one of ordinary skill in the art to which the presently disclosed subject matter belongs. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in this application, including the claims. Thus, for example, reference to "a coil" includes a plurality of such coils, and so forth.

Unless otherwise indicated, all numbers expressing quantities of ingredients, reaction conditions, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

As used herein, the term "about," when referring to a value or to an amount of a composition, dose, mass, weight, temperature, time, volume, concentration, percentage, etc., is meant to encompass variations of in some embodiments ±20%, in some embodiments ±10%, in some embodiments ±5%, in some embodiments ±1%, in some embodiments ±0.5%, and in some embodiments ±0.1% from the specified amount, as such variations are appropriate to perform the disclosed methods or employ the disclosed compositions.

The term "comprising", which is synonymous with "including" "containing" or "characterized by" is inclusive or open-ended and does not exclude additional, unrecited elements or method steps. "Comprising" is a term of art used in claim language which means that the named elements are essential, but other elements can be added and still form a construct within the scope of the claim.

As used herein, the phrase "consisting of" excludes any element, step, or ingredient not specified in the claim. When the phrase "consists of" appears in a clause of the body of a claim, rather than immediately following the preamble, it limits only the element set forth in that clause; other elements are not excluded from the claim as a whole.

As used herein, the phrase "consisting essentially of" limits the scope of a claim to the specified materials or steps, plus those that do not materially affect the basic and novel characteristic(s) of the claimed subject matter.

With respect to the terms "comprising", "consisting of", and "consisting essentially of", where one of these three terms is used herein, the presently disclosed and claimed subject matter can include the use of either of the other two terms.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

It will be understood that various details of the presently disclosed subject matter may be changed without departing from the scope of the presently disclosed subject matter. Furthermore, the foregoing description is for the purpose of illustration only, and not for the purpose of limitation.

What is claimed is:

1. An integrated rotary evaporator apparatus, comprising:
a vertically oriented evaporator configured to evaporate a sample to form a sample evaporate;
a mixing apparatus configured to mix the sample in the evaporator, the mixing apparatus comprises an overhead stirrer configured to stir the sample in an interior of the evaporator, the overhead stirrer comprising a motor, a drive shaft extending into the interior of the evaporator, and an agitator connected to the drive shaft;
a condenser configured to condense the evaporated sample into a condensate, the condenser comprising a cooling coil;
a collection vessel configured to collect the condensate;
a vacuum pump configured to create a vacuum in the evaporator; and
a refrigeration system integrated into the condenser, wherein the refrigeration system comprises a compressor, refrigeration condenser and a refrigerant, wherein the refrigeration system provides the refrigerant directly to the cooling coil of the condenser to thereby cool the cooling coil and condense the sample evaporate from the evaporator coming into contact with the cooling coil,
wherein the vertically oriented evaporator, mixing apparatus, condenser, collection vessel, vacuum pump and refrigeration system are integrated into a single apparatus,
wherein the condenser has a cooling capacity of at least 4,000 watts at −10° C.

2. The integrated rotary evaporator apparatus of claim 1, wherein the mixing apparatus is configured to stir the sample at about 500 to about 6,000 revolutions per minute (rpm).

3. The integrated rotary evaporator apparatus of claim 1, wherein the vertically oriented evaporator comprises a large volume vessel having a volume of about 6 L to about 100 L.

4. The integrated rotary evaporator apparatus of claim 1, wherein the vertically oriented evaporator comprises a product drain valve, wherein the vertically oriented evaporator comprises a sample valve.

5. The integrated rotary evaporator apparatus of claim 1, further comprising a heating mantle configured to heat the sample in the vertically oriented evaporator.

6. The integrated rotary evaporator apparatus of claim 1, further comprising a cooling coil configured to engage the condenser so as to provide the condenser with the ability to cool and condense the sample evaporate coming into contact with the condenser.

7. The integrated rotary evaporator apparatus of claim 1, wherein the refrigerant is provided to a double coil inside the condenser, wherein the double coil inside the condenser is configured to contact the sample evaporate.

8. The integrated rotary evaporator apparatus of claim 1, wherein the condenser comprises two or more condensers in a series.

9. The integrated rotary evaporator apparatus of claim 1, further comprising an adaptive cooling regulator configured to increase or decrease the cooling capacity of the condenser and/or refrigeration system.

10. The integrated rotary evaporator apparatus of claim 9, wherein the adaptive cooling regulator comprises a digitized expansion valve.

11. The integrated rotary evaporator apparatus of claim 9, wherein the adaptive cooling regulator increases the cooling capacity of the condenser and/or refrigeration system upon detecting an increased heat load from the evaporator, and the adaptive cooling regulator decreases the cooling capacity of the condenser and/or refrigeration system upon detecting a decreased heat load from the evaporator.

* * * * *